Sept. 8, 1964          H. L. FISHER          3,147,635

TRANSMISSION

Filed Jan. 31, 1962

INVENTOR.
Hugh L. Fisher
BY
Hugh L. Fisher
ATTORNEY

United States Patent Office 3,147,635
Patented Sept. 8, 1964

3,147,635
TRANSMISSION
Hugh L. Fisher, Birmingham, Mich., assignor to General Motors Corporation, Detroit, Mich., a corporation of Delaware
Filed Jan. 31, 1962, Ser. No. 170,111
16 Claims. (Cl. 74—472)

This invention relates to transmissions and particularly to improvements in transmissions of the automatic type adapted for use, although not exclusively, with motor vehicles.

Because of body styling trends and other reasons such as the desirability for weight reduction, continuous efforts are being made to reduce the space needed for vehicle transmissions. Whether the transmission is mounted in the front or in the rear of the vehicle, length is always of primary concern. With the front mounted transmission, it is presently necessary to form a tunnel in the floor board of the vehicle in order to accommodate the longitudinal dimension of the transmission, whereas with a rear mounted transmission, the length dimension may interfere with what are considered to be acceptable width and length dimensions for a particular vehicle body. Despite this goal, any reduction in the space requirements should, of course, not compromise the effectiveness of the transmission, e.g., reduce the transmission ratio coverage.

Accordingly, the invention contemplates a uniquely arranged transmission requiring a minimum of space along the axis of the transmission. The invention further seeks to provide a transmission wherein the drive units thereof are particularly suited for radial disposition so as to reduce the axial dimension while still affording adequate drive ratio coverage. More specifically, the invention contemplates a transmission utilizing radially arranged and concentrically aligned hydrodynamic torque transmitting devices along with gearing for providing a plurality of drive ratios. The devices are rendered effective in a certain sequence so as to cooperate with the gearing and thereby provide a plurality of drive ratios.

Automatic transmissions having shifts frequently require a very complex control system to obtain smooth shifts at optimum speeds. In order to achieve this, the control system demands numerous calibrations and provision for compensating for different conditions that arise.

It is, therefore, an aim of the invention to provide a transmission that inherently requires a minimum of controls, one wherein uniquely arranged drive units afford in effect self-control and by their nature offer smoothness in the transitions from one drive ratio to another. Specifically, the transmission utilizes a series of hydrodynamic torque transmitting devices so arranged that the fluid proceeds successively from one to another according to a desired scheme thereby affording gradual transitions to different drive ratios. Moreover, the controls incorporate a novel way for controlling the rate of supply of fluid pressure to the devices in accordance with torque demand and the speed of one of the units.

The foregoing and other objects and advantages of the invention will become apparent from the following description and the accompanying drawings in which:

FIGURE 1 illustrates schematically a transmission and a control system therefor both incorporating the principles of the invention; and FIGURE 2 shows schematically a transmission that is a modification of the FIGURE 1 transmission.

Referring now to the drawings in detail and particularly to FIGURE 1, the numerals 10 and 12 designate, respectively, power and load shafts. The power shaft 10 may be connected to the vehicle engine (not shown) and the load shaft 12 to the vehicle wheels in a known way. In between these two shafts 10 and 12 are a series of hydrodynamic torque transmitting devices, such as the fluid couplings hereinafter referred to as first, second, and third speed couplings 14, 16, and 18, and planetary gearing denoted generally at 20. This drive arrangement will provide three forward speed drives and a reverse drive as will become apparent.

The planetary gearing 20 includes a split-type forward drive gear unit 22 and a reverse drive gear unit 24. The forward drive gear unit 22 has its planet carrier 26 drive connected to the power shaft 12. Journaled on the carrier 26 are at least two spaced apart and suitably drive connected planet pinions 28 and 30, each of which has the same number of teeth for reasons to become apparent. The pinion 28 intermeshes with an input ring gear 32 and an input sun gear 34, whereas the pinion 30 mates with a reaction ring gear 36 and a reaction sun gear 38. Both ring gears 32 and 36 and both sun gears 34 and 38 also have the same number of teeth.

The reaction sun gear 38 is restrained from backward rotation by a one-way device 40 and a second speed brake 42. The one-way device 40 is of a known kind having inner and outer concentric races between which are arranged locking elements such as sprags, rollers, etc. The first speed brake 42 is shown as the disk type and may be actuated by fluid pressure in the usual way. Other brake constructions may be employed, e.g., cones, brake bands, etc. Also, the brake 42 may be actuated in some other known fashion, as by electrical power or mechanically.

The reaction ring gear 36 is prevented from backward rotation by a one-way device 44 and a first speed brake 46. The one-way device 44 and the first speed brake 46 may be similar respectively to the one-way device 40 and the brake 42. It should be noted that, if desired, the first speed brake 46 may be used to also serve the function of the second speed brake 42 merely by connecting the brake 46 to the outer race of the one-way device 40.

The other part of the planetary gearing 20, namely the reverse drive gear unit 24, has the output planet carrier 48 therefor drive connected to the forward drive planet carrier 26. The carrier 48 has revolvably mounted thereon at least one planet pinion 50 that intermeshes with a reaction ring gear 52 and a sun gear 54, the latter of which is drive connected to the forward drive input ring gear 32. A reverse brake 56 of the band type prevents rotation of the reverse ring gear 52. The reverse brake may be of other construction if preferred, and may be actuated in the same way as the first and second speed brakes 42 and 46.

The different inputs to the gearing 20 are connected to the power shaft 10 by the first, second and third speed couplings 14, 16, and 18. The couplings 14, 16, and 18 each have vaned impellers or pumps 58, 60 and 62 and vaned turbines 64, 66, and 68. Fluid is supplied to the couplings 14, 16, and 18 in a manner to be explained, such that drive is transferred from the impeller to the turbine of the couplings by this fluid in the usual way. In this embodiment, the first speed coupling turbine 64 is connected to the fluid drive input sun gear 34; the second speed coupling turbine 66 to the fluid drive input ring gear 32; and the third speed coupling turbine 68 to both the reverse drive and the forward drive carriers 48 and 26.

Fluid under pressure for the couplings 14, 16, and 18 is supplied by a pump 70, preferably driven at a speed corresponding to that of the power shaft 10. Pump 70 withdraws fluid from a sump 72 and delivers this fluid at a pressure determined by a suitable pressure regulator valve 74 to an outlet conduit 76. This fluid under pressure then proceeds through a rate control valve 78 to an inlet 80 for the first speed coupling 14.

The outlet of the first speed coupling 14 is closed by a 1–2 speed shift valve 82, which is revolvable with the impeller 58 and which includes a ball 84 and a compression spring 86. The 1–2 speed shift valve 82 will open when the speed of rotation of the impeller 58 causes a predetermined centrifugal force both from the weight of the ball 84 and from the fluid in the coupling 14 to be applied to the valve 82. By way of example, this predetermined centrifugal force may correspond to a vehicle speed of 10 m.p.h., assuming a moderate resistance is exerted on the load shaft 12.

When the 1–2 speed shift valve 82 opens, the fluid in the first speed coupling 14 proceeds to the second speed coupling 16. The outlet of the second speed coupling 16 has an orifice 88 therein and also includes a 2–3 speed shift valve denoted generally by the numeral 90. The 2–3 speed shift valve 90 is similar to the 1–2 speed shift valve 82 and includes a ball 92 and a spring 94. The relationship between the amount of fluid delivered to the second speed coupling 16 and the orifice 88 is such that the second speed coupling 16 is made fully operative while the first speed coupling 14 becomes inoperative. The second speed coupling 16 will continue in operation until the 2–3 speed shift valve 90 opens due to the combined effects of centrifugal force acting thereon from the weight of the ball 92 and from the fluid within the coupling 16. Again with a moderate load, it will be assumed that this speed is 18 m.p.h.

When the 2–3 speed shift valve 90 opens, the fluid contents of the second speed coupling 16 will transfer to the third speed coupling 18 whereupon the third speed coupling 18 will become operative. The rate of supply to the third speed coupling 18 will be sufficient to maintain it full and therefore completely operative while both the orifice 88 and an orifice 96 are effective to exhaust fluid at a controlled rate. However, the couplings 14 and 16 will not be effective.

The rate control valve 78 includes a spool type valve element 98 having spaced lands 100 and 102 and is slidable within a bore 104 in a valve body 106. A spring 108 biases the valve element 98 away from a shoulder 110 in the bore 104.

The rate control valve 78, in addition to the spring 108, is influenced by both the torque demand and vehicle speed. The torque demand is derived through a suitable throttle actuated valve 112 that operates in a known way. In this embodiment, the throttle actuated valve 112 is a suitable regulating valve that, in a known way, regulates fluid pressure delivered thereto from a branch 114 of the supply conduit 76. This fluid pressure is regulated in accordance with the position of the accelerator pedal 116 and then delivered by a conduit 118 to the spring end of the valve element 98. The vehicle speed responsive effect is obtained through utilization of a suitable governor 120, which is preferably of the hydraulic kind disclosed in the Patent 2,204,872 to Thompson. Briefly, the governor 120 incorporates a regulating type valve that is rotated at a speed corresponding to that of the load shaft 12 and will develop from the inlet pressure supplied thereto by the conduit 76 an outlet pressure in a conduit 122 that corresponds to the speed of the load shaft 12.

During operation of the rate control valve 78, the valve element 98 will assume a position determined by the bias of the spring 108 and the relative values of the opposing forces from the governor and torque demand pressures so as to connect a branch 124 of the supply conduit 76 to different ones of a series of outlets 126, 128, and 130 extending to the first speed coupling inlet 80. Hence, the sizes of the outlets 126, 128, and 130 are selected relative to the inlet 124 to insure that the couplings receive adequate fluid for the different operating conditions.

In operation, Neutral is established by disengaging both of the first and second speed brakes 46, 42. Also, the rate control valve 78 will be in its leftmost position in which fluid is supplied by the branch 124 only through outlet 126 to the first speed coupling 14. The rate of supply will be adequate to quickly fill the first speed coupling 14.

When forward drive is wanted, the brakes 46 and 42 are engaged and the coupling 14 will commence to rotate the forward drive input sun gear 34. Since, as explained, the input sun gear 34 and the reaction sun gear 38 have the same number of teeth as do the input ring gear 32 and the reaction ring gear 36, the reaction sun gear 38 will revolve forwardly at the same speed as the input sun gear 34 and this will be permitted by the one-way device 40. On the other hand, the reaction ring gear 36 will be prevented from backward rotation by the one-way device 44 and the first speed brake 46 as will be input ring gear 32. This will cause the output planet carrier 26 to revolve the load shaft 12 in the first drive ratio, which will afford the greatest torque multiplication.

As mentioned, at approximately 10 m.p.h., the ball 84 for the 1–2 speed shift valve 82 will, because of the combined centrifugal forces from the weight of the ball 84 and from the fluid within the coupling 14 developed by the rotation of the impeller 58, move off its seat and permit the fluid within the coupling 14 to pass to the second speed coupling 16. At this same time, the rate control valve 78 will assume a position in which now both the outlets 126 and 128 will receive fluid from the branch 124 so as to insure that the second speed coupling 16 is supplied with adequate fluid to compensate for that exhausted through the orifice 88 and give the desired circulation for cooling purposes. With only the second speed coupling 16 now effective to transfer drive from the power shaft 10, the forward drive input ring gear 32 will be revolved forwardly while the reaction sun gear 38 and accordingly the sun gear 34 will be prevented from backward rotation by the one-way device 40 and the second speed brake 42. The planet carrier 26 now will be revolved and, therefore, the load shaft 12 in the second drive ratio.

Because the sun gear 34 will be stationary, the first speed coupling turbine 64 will also be stationary. However, the circulation of fluid through the first speed coupling 14 is such that no appreciable forward drive component of force is imposed on the vanes of the turbine 64.

Preferably, just prior to establishment of the second drive ratio, the rate control valve 78 will have moved to a position in which the outlet 128 is also in communication with the branch 124. The resultant increase in the supply of fluid pressure to the first speed coupling will insure that the second speed control valve 82 quickly opens to initiate the first to second speed shift. If the torque demand demonstrated by the position of the accelerator pedal 116 is substantial at this time, indicating that the driver wishes rapid acceleration, the movement of the brake control valve 78 to this latter position in which the outlet 128 is also opened is delayed so as to maintain the first speed status of the transmission. This will be accomplished because the force from the pressure in the spring end of the valve element 98 will be greater than that from the governor pressure on the opposite end.

The shift from second speed to third speed may, as suggested, occur at approximately 18 m.p.h. Just prior to this transition, the rate control valve 78 will have moved to a position in which all of the outlets 126, 128, and 130 are placed in communication with the branch 124. Again, if the torque demand is great at this time, the opening of the outlet 130 will be delayed and accordingly the transition from second to third. However, if the opening 130 does receive pressure fluid, this additional pressure fluid will facilitate the quick opening of the 2–3 speed shift valve 90 and cause the fluid within the coupling 16 to be transferred to the coupling 18, thus rendering the coupling 18 effective. The combined effect of the orifice 88 and the orifice 96 will insure that the amount of fluid supplied to the couplings 14 and 16 and 18 will not be adequate to maintain or cause either the first or second speed couplings 14 and 16 to become effective. The third speed coupling 18 having the turbine 68 thereof connected directly to the forward drive carrier 26, will cause the load shaft 12 to be revolved at substantially the same speed as the power shaft 10 and thereby produce a substantially direct drive in the third drive ratio in which all elements of the forward drive gearing 22 revolve forwardly unrestricted by the brakes 42 and 46.

Downshifts will occur in succession and in the aforedescribed manner. The 3-2 speed shift will take place when the 2-3 speed shift valve 90 closes, whereupon the coupling 18 will be drained via orifice 96 and the coupling 16 will become operative. Similarly, a 2-1 speed shift will occur when the 1-2 speed shift valve 82 closes. At this time, the coupling 14 becomes effective and the coupling 16 is drained through orifice 88.

For reverse drive, only the reverse brake 56 is engaged and the first speed coupling 14 is filled with fluid in the same way as in the first drive ratio. This causes the forward drive input sun gear 34 to be revolved forwardly whereupon the ring gear 32 is revolved backwardly to carry therewith the reverse drive sun gear 54. With the reverse drive reaction ring gear 52 held from rotation, the reverse carrier 48 will be revolved backwards and accordingly turn both the forward drive planet carrier 26 and the load shaft 12 in the reverse direction at a ratio determined by the reverse drive gear unit 24. The second and third speed couplings 16 and 18 will not be effective in reverse drive. To insure that these couplings 16 and 18 cannot become effective, any suitable means may be made for preventing the 1-2 speed shift valve 82 from opening in reverse drive.

In the FIGURE 2 transmission, only couplings 14′ and 16′ are employed. The gearing 20 is identical with that in the FIGURE 1 transmission and therefore the same numerals are used. With this FIGURE 2 arrangement, the first speed coupling 14′ will be effective in first speed to transfer drive to the load shaft 12 through the gearing 20 in the same way as perviously described with respect to the FIGURE 1 transmission. Similarly, the transition from first speed to second speed takes place in the same way as with the FIGURE 1 transmission, namely by the upshift of the 1-2 speed shift valve 82′ so that the second speed coupling 16′ becomes effective to transfer drive from the power shaft 10 to the forward drive input ring gear 32.

The difference between the FIGURES 1 and 2 transmission occurs in third speed, which, in the FIGURE 2 transmission, is established by increasing the supply of pressure fluid delivered to the first and second speed couplings 14′ and 16′ to a quantity that will be great enough to maintain both the couplings 14′ and 16′ filled. This would be accomplished by the same rate control valve 78 as utilized in the FIGURE 1 transmission and would occur when the rate control valve 78 assumes the position in which all three outlets 126, 128, and 130 are connected to the inlet 80′ to the couplings 14′ and 16′. The supply of fluid pressure would be, under these conditions, selected so as to be adequate in view of the exhaust orifice 132 from the second speed coupling 16′. With both the first and second speed couplings 14′ and 16′ effective, the forward drive input ring gear 32 and input sun gear 34 will both be revolved at substantially the same speed and this would cause the output planet carrier 26 to be similarly revolved at the same speed and a direct drive ratio obtained. The only variation between the speed of the load shaft 12 and the speed of the power shaft 10 as with the FIGURE 1 transmission will be due to the inherent slippage within the couplings 14′ and 16′.

For a 3-2 speed downshift to occur with the FIGURE 2 transmission, the supply of fluid from the rate control valve 78 is reduced to that needed to maintain only the coupling 16′ operative. This is accomplished merely by calibrating the rate control valve 78 in a known way. The 2-1 speed downshift will take place in the same way as in the FIGURE 1 transmission.

From the foregoing, it will now be appreciated that by having the fluid couplings 14, 16, and 18 radially arranged and concentrically aligned, the axial dimension of the transmission can be substantially reduced, particularly if the transmission is mounted at the back of the engine and the engine is in the front of the vehicle. This means that the area inherently available at this point is utilized instead of requiring that a substantial tunnel be formed in the floorboard of the vehicle. Also, if the transmission is mounted at the rear of the vehicle, the axial dimension is of no concern whether the transmission is mounted with its power and load shaft axes aligned with the longitudinal axis of the vehicle or with the axis of the rear wheel. Additionally, a minimum of gearing as well as controls are needed for producing three different forward speeds. The controls are in effect built into the structure so as to exercise self-control. Shift points are correlated with vehicle speed and torque demand to obtain the best shift point for meeting varying conditions.

The invention is to be limited only by the following claims.

I claim:

1. In combination, an input, plural outputs, a series of hydrodynamic torque transmitting devices, each having the driving and driven elements thereof drive connected respectively to the input and one of the outputs and each being operative to transfer drive therebetween when fluid is supplied thereto, and a source of fluid communicating with the devices, the devices being so arranged and aligned relative to each other that the fluid from the source flows first to one of the devices and then is drained directly from the one device into another of the devices as the speed of one of the elements varies thereby causing first the one of the devices and next the another of the devices to drive connect the input to the corresponding output.

2. In combination, an input, plural outputs, a series of radially arranged and concentrically aligned hydrodynamic torque transmitting devices each having the driving element thereof drive connected to the input and the driven element thereof drive connected to one of the plural outputs, a source of fluid communicating with the devices, the devices being so arranged that the fluid from the source flows from one device to another of the devices thereby rendering the another device effective to transfer drive between the input and the corresponding output, and means controlling the fluid flow between the devices.

3. In combination, an input, plural outputs, a series of fluid couplings each having the driving element thereof driven connected to the input and the driven element thereof drive connected to one of the plural outputs and each being operative to transfer drive therebetween when fluid is supplied thereto, a source of fluid communicating with the fluid couplings, the fluid couplings being so arranged and aligned relative to each other that fluid flows from the source first to one of the fluid couplings and then is drained directly from the one fluid coupling and transferred successively to the other fluid couplings thereby rendering different ones of the couplings effective to transfer drive between the input and the corresponding output, and centrifugally operated means controlling the flow of fluid between the fluid couplings.

4. In combination, an input, plural outputs, a series of hydrodynamic torque transmitting devices each having the driving element thereof drive connected to the input and the driven element thereof drive connected to one of the plural outputs and each being operative to transfer drive therebetween when fluid is supplied thereto, a source of fluid communicating with the devices, the devices being so arranged and aligned relative to each other that the fluid from the source flows first to one of the devices and then is drained directly from the one of the devices into another of the devices thereby rendering the one of the devices inoperative and the another of the devices operative to transfer drive between the input and the corresponding output, and rate control means operative to control the rate of fluid flow to the devices from the source.

5. In combination, an input connected to a power source, plural outputs connected to a load, a series of hydrodynamic torque transmitting devices, each having the driving element thereof drive connected to the input and the driven element thereof drive connected to one of the outputs and each being operative to transfer drive therebetween when fluid is supplied thereto, a source of fluid communicating with the devices, the devices being so arranged and aligned relative to each other that the fluid from the source flows first to one of the devices and then is drained directly from the one of the devices into another of the devices thereby rendering the one of the devices inoperative and the another of the devices operative to transfer drive between the input and the corresponding output, centrifugally operated means controlling the flow of fluid between the devices and rate control means operative to control the supply of fluid from the source to the devices in accordance with a speed corresponding to the speed of one of the elements and the torque demand on the power source.

6. In combination, an input connected to a power source, plural outputs connected to a load, a series of radially arranged and concentrically aligned fluid couplings, each having the driving element thereof drive connected to the input and the driven element thereof drive connected to one of the plural outputs, a source of fluid communicating with the couplings, centrifugally operated valve means operative in response to the speed of one of the elements for controlling the flow of fluid between the fluid couplings so as to cause one of the fluid couplings to be inoperative and another of the fluid couplings to be operative to transfer drive between the input and the associated output, and rate control means controlling the supply of pressure fluid to the couplings from the source in response to a speed corresponding to the speed of one of the outputs and the torque demand on the power source.

7. In a transmission, power and load members, plural power paths drive connecting the power and load members, each power path affording a different drive ratio when completed, a hydrodynamic torque transmitting device in each power path for completing the power path when operative, a source of fluid communicating with the devices, the devices being so arranged and aligned relative to each other that the fluid from the source flows first to one of the devices and is drained directly from the one of the devices and successively transferred through the devices thereby rendering one device inoperative and another device operative, and means controlling the flow of fluid between the devices.

8. In a transmission, power and load members, plural power paths drive connecting the power and load members, each power path affording a different drive ratio when completed, a series of radially arranged and concentrically aligned fluid couplings for completing different ones of the power paths, and control means rendering different ones of the couplings effective so as to complete the associated power path.

9. In a transmission, the combination of power and load members, gearing drivingly interposed between the power and load members, gearing including plural inputs and an output drive connected to the load member, ratio changing mechanism for altering the drive ratios through the gearing, a series of hydrodynamic torque transmitting devices each having the driving element thereof drive connected to the power member and the driven element thereof drive connected to one of the inputs to the gearing and each being operative to transfer drive therebetween when fluid is supplied thereto, a source of fluid communicating with the devices, the devices being so arranged and aligned relative to each other that the fluid from the source flows first to one of the devices and then is drained directly from the one device into another of the devices thereby rendering the one device inoperative and the another of the devices operative to transfer drive from the power member to the associated gearing input, and centrifugally operated means controlling the flow of fluid between the devices.

10. In a transmission, the combination of power and load members, planetary gearing drive connecting the power and load members, the planetary gearing including plural input gears, an output planet carrier drive connected to the load member, and a reaction gear, a series of readily arranged and concentrically aligned hydrodynamic torque transmitting devices each having the driving element thereof drive connected to the power member and the driven element thereof drive connected to one of the plural input gears, a source of fluid communicating with the devices, centrifugally operated means operative in response to the speed of one of the elements for controlling the flow of fluid from one of the devices to another of the devices so as to cause the one of the devices to be inoperative and the another of the devices to be operative to transfer drive between the power member and the associated input gear, and rate control means operative in response both to a speed corresponding to the speed of one of the elements and the torque demand to vary the supply of fluid to the devices from the source.

11. In a transmission, the combination of a power shaft, a load shaft, planetary gearing drivingly interposed between the power and load shafts, the planetary gearing including plural input elements, a reaction element and an output element drive connected to the load shaft, ratio changing mechanism cooperating with the planetary gearing to provide a series of drive ratios therethrough, and a series of radially arranged and concentrically aligned fluid couplings each having the pumps thereof drive connected to the power shaft and the turbines thereof drive connected to different ones of the input gears to the planetary gearing so that when one of the fluid couplings is operative the associated input gear is drive connected to the power shaft and the transmission becomes conditioned for one of the drive ratios, a source of fluid communicating with the fluid couplings, and means controlling the flow of fluid from one fluid coupling to another fluid coupling so as to render the one fluid coupling inoperative and the another fluid coupling operative.

12. In a transmission, the combination of a power shaft, a load shaft, planetary gearing drivingly interposed between the power and load shafts, the planetary gearing including an output planet carrier drive connected to the load shaft and having a planet pinion journaled thereon, an input ring gear and an input sun gear meshing with the planet pinion, a reaction ring gear and a reaction sun gear also meshing with the planet pinion, ratio changing mechanism coacting with the reaction gears so as to condition the planetary gearing for different drive ratios, and a series of radially arranged and concentrically aligned fluid couplings each having the driving element thereof drive connected to the power shaft, one of the fluid couplings having the driven element thereof drive connected to the input sun gear, another of the fluid couplings having the driven element thereof drive connected to the input ring gear, and still another of the fluid couplings having the driven element thereof drive connected to the output planet carrier, a source of fluid communicating with the fluid couplings, centrifugally operated valve means operative in response to a speed corresponding to the speed of one of the elements to cause fluid to flow from the source successively through the fluid couplings and thereby cause the input sun gear, the input ring gear, and the output planet carrier to be drive connected to the load shaft in a predetermined sequence thereby providing three forward drive ratios through the transmission, and rate control valve means controlling the supply of fluid from the source to the fluid couplings in accordance with a speed corresponding to the speed of one of the shafts and torque demand.

13. In a transmission, the combination of a power shaft, a load shaft, planetary gearing drivingly interposed between the power and load shafts, the planetary gearing including an output planet carrier drive connected to the load shaft, the planet carrier having a planet pinion journaled thereon, an input ring gear and an input sun gear both meshing with the planet pinion, a reaction ring gear and a reaction sun gear also meshing with the planet pinion, ratio changing means associated with the reaction gears for causing the planetary gearing to provide a series of drive ratios therethrough, a pair of radially arranged and concentrically aligned fluid couplings, the fluid couplings both having the driving elements thereof drive connected to the power shaft, one of the couplings having the driven element thereof connected to the input sun gear, the other coupling having the driven element thereof connected to the input ring gear, a source of fluid communicating with the couplings, centrifugally operated valve means revolvable at a speed corresponding to the speed of the driving elements, the centrifugally operated valve means being operative to control the fluid flow between the fluid couplings so as to cause one of the fluid couplings to be exhausted into the other of the fluid couplings thereby rendering the one fluid coupling inoperative and the other fluid coupling operative to transfer drive, and rate control valve means controlling supply of fluid from the source to the fluid couplings in accordance with a speed corresponding to the speed of the load shaft and the torque demand.

14. In a transmission, the combination of an input, an output, plural power paths drive connecting the input and the output, each power path being arranged to afford a different drive ratio, and a series of radially aligned hydrodynamic torque transmitting devices so arranged relative to the plural power paths as to cause when operative different ones of the power paths to be completed and thereby cause the output to be driven in the different drive ratios, a source of fluid communicating with the devices, and means controlling the flow of fluid from one device to another so as to render the one device inoperative and the another device operative.

15. In a transmission, the combination of an input, an output, plural power paths drive connecting the input and the output, each power path being arranged to afford a different drive ratio when completed, a series of hydrodynamic torque transmitting devices, each device being associated with one of the plural power paths so as to cause when operative the associated power path to be completed and each being arranged to have fluid communication with each other, a source of fluid communicating with the devices, and means controlling the flow of fluid through the devices so that the fluid to one of the devices is drained directly from the one device into another of the devices thereby rendering the one device inoperative and the another device operative.

16. In a transmission, the combination of an input, an output, plural power paths drive connecting the input and the output, each power path affording a different drive ratio when completed, a series of radially arranged and concentrically aligned hydrodynamic torque transmitting devices, each device being associated with one of the plural power paths so as to cause when operative the associated power path to be completed, a source of fluid communicating with the devices, and centrifugally operated means operative to control the flow of fluid from one device to another device so as to render the one device inoperative and the another device operative.

References Cited in the file of this patent
UNITED STATES PATENTS

| | | |
|---|---|---|
| 2,150,151 | Burrows et al. | Mar. 14, 1939 |
| 2,437,333 | Pollard | Mar. 9, 1948 |
| 2,488,478 | Roberts | Nov. 15, 1949 |
| 2,851,906 | De Lorean | Sept. 16, 1958 |
| 2,919,597 | Borman | Jan. 5, 1960 |
| 3,016,768 | De Lorean | Jan. 16, 1962 |
| 3,023,637 | De Lorean | Mar. 6, 1962 |
| 3,084,568 | O'Malley | Apr. 9, 1963 |